Dec. 7, 1937.  E. YARNELL  2,101,771
PULLEY
Filed Jan. 7, 1937

Inventor
Elizabeth Yarnell
By Clarence A. O'Brien
Hyman Berman
Attorneys

Patented Dec. 7, 1937

2,101,771

UNITED STATES PATENT OFFICE 2,101,771

PULLEY

Elizabeth Yarnell, Elizabeth, N. J.

Application January 7, 1937, Serial No. 119,535

1 Claim. (Cl. 254—194)

This invention relates to pulleys and has more particular reference to a pulley of the type used in connection with clothes lines for supporting the latter.

An object of the present invention is to provide a pulley having means associated therewith for suspending the pulley from a hook or other suitable suspension element, and which means may be manipulated in a positive and efficient manner so as not to interfere with the usual knot in the clothes line when the line is being moved about the pulley incidental to the cleaning of the line, which cleaning of the line is generally resorted to immediately prior to hanging clothes on the line.

The invention together with its objects and advantages will be best understood from a study of the following description taken in connection with the accompanying drawing wherein:—

Figure 1:
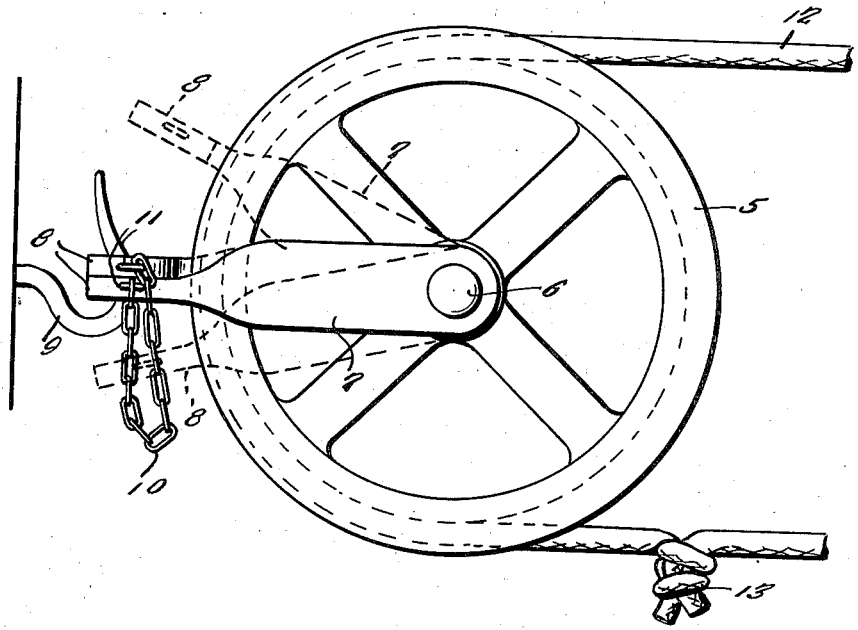
Figure 2:
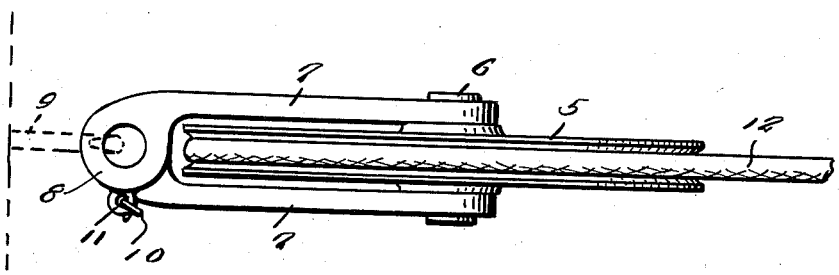

Figure 1 is a side elevational view illustrating the application of the invention and Figure 2 is a top plan view.

Referring to the drawing by reference numerals it will be seen that the improved clothes line pulley assembly comprises the grooved pulley 5 that is mounted on a stub axle or shaft 6.

A hanger for the pulley comprises a pair of arm members 7 which at one end are suitably apertured to accommodate the pulley axle or shaft 6, and which at their respective free ends taper and are formed integral with laterally inwardly extending apertured lugs 8 that are adapted to be disposed in superimposed relation as shown with the apertures therein aligning so as to accommodate the suspension hook 9.

At the lug equipped ends 8 thereof the hanger arms 7 are connected together through the medium of a suitable length of chain or other flexible element 10 the respective opposite ends of which are connected to the lugs 8 through the medium of eyes or the like 11.

A portion of the line trained over the pulley 5 is indicated by the reference numeral 12, and the knot in the line is indicated by the reference numeral 13.

In actual practice it will be seen that normally the lugs 8 are arranged in overlapping relation with the hook 9 passed therethrough for suspending the pulley 5 with the line 12 trained thereover from a wall or other suitable supporting structure.

When, however, it is desired to move the line 12 over the pulley 5 for the purpose, for example, of cleaning the line, the lugs 8 are lifted out of engagement with the hook 9 and the chain 10 then placed into engagement with the hook in a manner to support the pulley from the hook and at the same time permit the arms 7 to spread apart out of the path of the knot 13 thus permitting free movement of the line 12 over the pulley 5.

After the line has been wiped or otherwise cleaned the lugs 8 are then engaged with the hook 9 in the manner shown with the chain 10 hanging to one side as clearly shown in Figure 1.

Thus it will be seen that with a pulley involving the features of the present invention the entire line may be cleaned which is not the case with pulley assemblies now generally used due to the fact that the present pulley assemblies make no provision as would permit the knot of the line to pass over the pulley without interference with the suspension elements of the pulley assembly.

It is thought that a clear understanding of the construction, utility and advantages of an invention of this character will be had without a more detailed description.

Having thus described the invention, what is claimed as new is:—

A pulley assembly comprising a pulley wheel, an axle on which said wheel is mounted, a pair of hanger arms provided at one end with apertures receiving therein the respective opposite ends of said axle, said hanger arms at their free ends being provided with integral apertured lugs adapted to be arranged in alignment to engage a suspension hook or the like, and a flexible element of a suitable length, secured at its respective opposite ends to the lug equipped ends of said arms.

ELIZABETH YARNELL.